MULTIPLEX RADIO RECEIVER

Filed Feb. 18, 1948 2 SHEETS—SHEET 1

INVENTOR.
CORNELIS JOHANNES HENRICUS ANTONIUS STAAL
BY Fred M Vogel
AGENT.

INVENTOR.
CORNELIS JOHANNES HENRICUS ANTONIUS STAAL
BY Fred M Vogel
AGENT.

Patented Nov. 4, 1952 2,616,976

UNITED STATES PATENT OFFICE 2,616,976

MULTIPLEX RADIO RECEIVER

Cornelis Johannes Henricus Antonius Staal, Eindhoven, Netherlands, assignor to Hartford National Bank and Trust Company, Hartford, Conn., as trustee Application February 18, 1948, Serial No. 9,166
In the Netherlands March 5, 1947

2 Claims. (Cl. 179—15)

The invention relates to multiplex radio-receivers comprising a plurality of receiving channels being periodically operative in the rhythm of the cycle frequency and successively in the rhythm of the switching frequency and adapted to receive signal pulses which, by their duration or phase, characterize different signals. Such devices are used for the simultaneous reception of several telephone conversations or other signals such, for example, as Morse-signals, telex-signals or the like.

Once in each system cycle the receiving channels become operative for a short time, for example, under the effect of successive rectangular voltage pulses which sometimes are referred to as "gating-pulses."

The several receiving channels should be opened periodically and successively in exact isochronism with the opening of corresponding transmitter channels and in connection therewith it is customary to send out one synchronizing pulse per transmission cycle. In such a system one of the transmission channels is frequently utilised for the transmission of synchronizing pulses of a duration at least corresponding to one switching period, in which event consequently the synchronizing pulses are distinguished from the signal pulses by a longer duration and may be separated from the latter in the receiver by means of an integrating network (cf. "Wireless World" June 1946, page 187 "Details of Army Wireless Station No. 10").

A great disadvantage of known multiplex system of the above-described type, wherein the signals are transmitted by pulse-duration or pulse-phase modulation, is the so-called "cross-talk," i. e. the presence in a particular channel of signals originating from other channels.

The applicant has stated that, besides many other ways of cross-talk, cross-talk takes place from the receiving channel operative just before the reception of the synchronizing pulses to other channels, and this more particularly in the case of great "modulation depth," i. e. comparatively long maximum duration or phase deviation of the signal pulses.

According to the invention, in receivers of the type under consideration this disadvantage is almost completely avoided so that greater modulation depth is permissible, by supplying the received pulses, after amplitude detection, for the purpose of separating synchronizing and signal pulses, through a differentiating network to a threshold device from the output circuit of which the synchronizing pulses separated from the signal pulses are taken.

The time-constant of the differentiating network should preferably be smaller than the duration of the synchronizing pulses and larger than the (maximum) duration of the signal pulses.

It may be noted here that in television technique it is known to separate line- and image-synchronizing signals of different duration by means of a differentiating network.

The invention will now be explained more fully with reference to the accompanying drawings for the case of signals transmitted by pulse-phase modulation.

Figure 1:
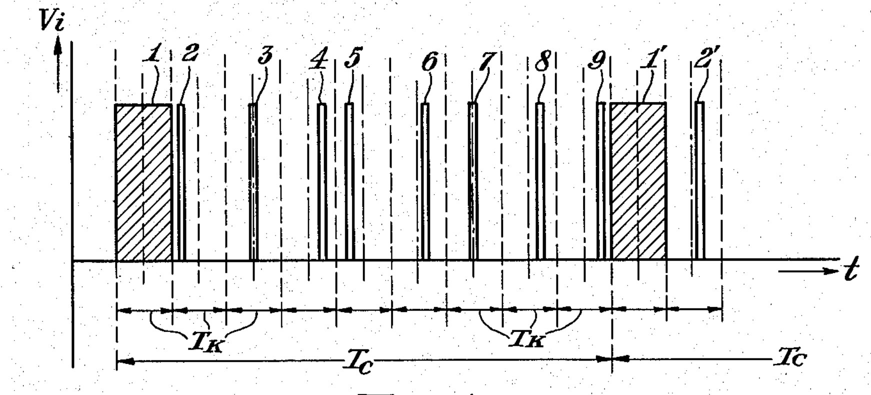
Fig. 1 shows the pulses received, after amplitude detection, during slightly more than one period of the cycle frequency with a known system comprising nine transmission channels of which one serves to transmit synchronizing pulses.

In Fig. 1 the pulses obtained after amplitude detection, limitation, etc. in a 9-channel multiplex system are represented in a time diagram for a duration corresponding slightly more than one cycle period $T_c$ (99 μsec.). A cycle period is subdivided into 9 equal channel periods $T_k$ (11 μsec.), the first of which is taken up each time by synchronizing pulses 1, 1' represented by hatched areas. In the further 8 channel periods occur signal pulses 2, 3 . . . 8, 2' etc. which have a constant duration (1.5 μsec.) and which characterize the transmitted signal by their phase-deviation with respect to the middle (indicated by a dot-dash line) of a channel period.

The signal pulses 3 and 7 exhibit no phase deviation, the signal pulses 2 and 5 exhibit a negative and the signal pulses 4, 6, 8, 9 and 2' a positive phase deviation, the phase deviation of signal pulse 9 being a maximum.

As is well-known, the synchronizing and signal pulses may be separated by means of an integrating network and a subsequent threshold device.

Figure 2:
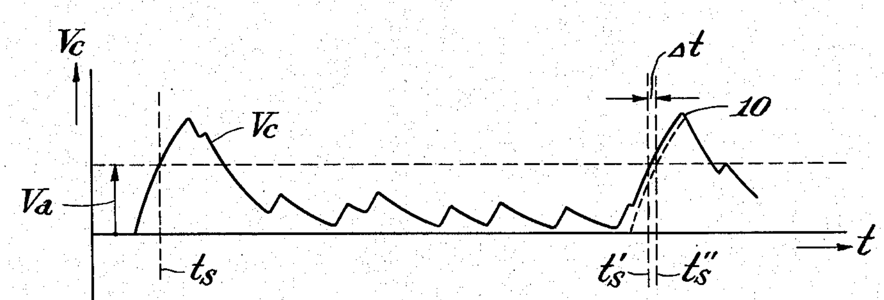
Fig. 2 represents the output voltage of an integrating network utilised, in accordance with the known method, for separating synchronizing and signal pulses.

In Fig. 2, $V_c$ represents the output voltage set up across the condenser of an integrating network with a time constant of about 8 μsec. and $V_a$ represents the threshold voltage. Whenever the output voltage $V_c$ crosses the threshold voltage $V_a$ in the positive direction, i. e. at the moments $t_s$ and $t'_s$, a synchronizing pulse occurs in the receiver.

The cause of the cross-talk phenomenon stated by the applicant appears from Fig. 2, for the position of the moment $t_s$ or $t'_s$ greatly depends upon the time interval between the presence of signal pulse 9 and synchronizing pulses 1'. With maximum positive phase deviation of the signal pulse 9 the condenser voltage $V_c$ (moment $t'_s$) crosses the threshold voltage $V_a$ appreciably sooner, and this to an extent dependent upon the phase deviation of the signal pulse 9, than with maximum negative phase deviation of this pulse, in which event the condenser voltage would exhibit the variation indicated by a dotted line 10 with the moment of crossing $t''_s$ which is later than $t'_s$ by a time interval $\Delta_t$. The synchronizing pulses occurring in the receiver thus acquire a phase modulation which corresponds to the modulation of the signal pulse 9 and which therefore becomes audible in all other channels with the same intensity.

According to the invention, this cross-talk via the synchronization channel is avoided to a high extent by separating the synchronizing and and signal pulses by means of a differentiating network.

Figure 3:
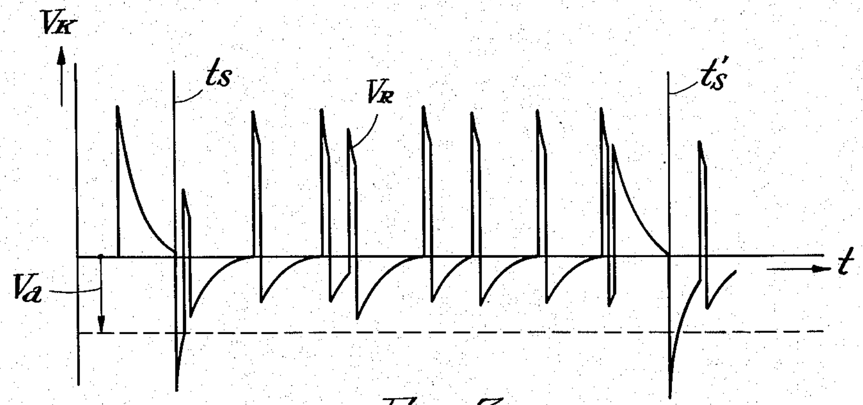
Fig. 3 represents the output voltage of a differentiating network utilised for separating synchronizing and signal pulses in accordance with the present invention.

Fig. 3 represents the voltage $V_r$ set up across the output resistance of a differentiating network as a function of time in the case of an input voltage variation as shown in Fig. 1.

A more advantageous time constant of the differentiating network can now be taken (in the present case about 4 $\mu$sec.) and, moreover, the considerably steeper flanks of the output voltage counteract variation of the moment at which this voltage crosses the threshold voltage $V_a$ (which is now taken negative) in the negative direction. The phase modulation of the synchronizing pulses occurring in the receiver which remains behind due to the modulation of the signal pulse 9 is so slight that it cannot be represented in the drawing. By taking the measure according to the invention cross-talk via the synchronization channel is thus, in comparison with the known system, considerably reduced without additional costs.

Figure 4:
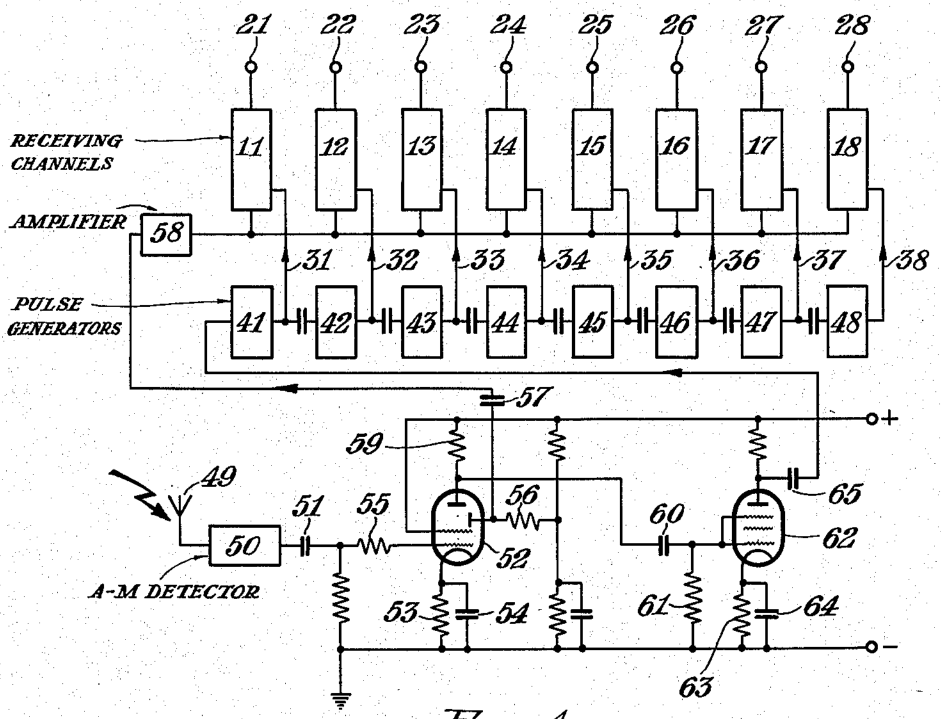
Fig. 4 represents, partly as a block diagram, a circuit arrangement of a multiplex receiver according to the invention.

Fig. 4 represents, as far as is necessary in detail, the circuit-arrangement of a multiplex receiver according to the invention. The receiver exhibits 8 receiving channels 11 to 18 with separate output terminals 21 to 28, which channels become operative, by means of gating pulses fed thereto by conductors 31 to 38, periodically in the rhythm of the cycle frequency and successively in the rhythm of the switching frequency.

The gating pulses are produced by means of pulse generators 41 to 48 the number of which corresponds to that of the channels. These generators excite one another in sequence and thus produce a series of successive gating pulses each time after the pulse generator 41 has been excited by a synchronizing pulse.

These synchronizing pulses are taken from a circuit as shown in detail in the lower part of Fig. 4. The radio-signals captured by an antenna 49 and modulated by the pulses shown in Fig. 1 are supplied, after amplification and amplitude detection (50), through a coupling condenser 51 to an amplifier comprising a secondary-emission tube 52 which acts, moreover, as a threshold- and amplitude-limiting device owing to a suitable grid bias on the one hand (cathode resistance 53 and parallel condenser 54) and to the presence of a resistance 55 serving to limit the control-grid current on the other hand.

From an output resistance 56 included in the auxiliary cathode lead of the tube 52 are taken amplified pulses of positive polarity which have been given the correct shape; these pulses are supplied, through a coupling condenser 57 and an amplifier 58, in parallel-connection to all the receiving channels 11 to 18. From an anode resistance 59 of the secondary-emission tube 52 are likewise taken the amplified pulses of negative polarity and correct shape, the polarity of these pulses being now, however, negative and therefore opposite to that shown in Fig. 1. For the purpose of separating synchronizing and signal pulses these pulse signals, which otherwise correspond to those shown in Fig. 1, are supplied to a differentiating network consisting of the series-connection of a condenser 60 and a resistance 61. The voltage across the resistance 61, which exhibits the same variation, as shown in Fig. 3, but with opposite polarity, is fed to the control grid of a pentode-amplifier 62. Owing to the presence of a cathode resistance 63 and a condenser 64 connected in parallel thereto, the control grid of this tube has a negative grid bias which normally cuts off the tube of a value such that the tube is made operative only by voltages exceeding the threshold voltage ($V_a$) shown in Fig. 3, which results in that each time the tubes respond only at the end of a synchronizing pulse and then, at the moments indicated in Fig. 3 by $t_s$ and $t'_s$, a synchronizing pulse of negative polarity is supplied through a coupling condenser 65 to the first of the pulse generators 41 to 48, which pulse initiates the successive operation of the receiving channels 11 to 18.

It is evident that the invention may also be successfully applied if the receiving channels are successively made operative in a manner other than that described above, for example by means of mechanical or electronic distribution switches or the like of any type known per se.

What I claim is:

1. In a multiplex receiver for the reception of periodically transmitted trains of high-frequency pulses, each train being constituted by a synchronizing pulse of fixed duration and a series of channel pulses, the duration or phase of each channel pulse being modulated in accordance with a distinct intelligence signal, the fixed duration of said synchronizing pulse exceeding the maximum duration of any one of said channel pulses, the combination comprising means to detect the train of high-frequency pulses to produce a corresponding train of direct-current pulses, a differentiating network coupled to the output of said detecting means to derive impulses whose time position corresponds to the trailing edge of said direct-current pulses, said network having a time constant at which the amplitude of the impulse corresponding to the synchronizing pulse exceeds the ampltiude of the remaining impulses, and a threshold device coupled to the output of said network, said device having a threshold level at which said device is responsive solely to the impulse corresponding to said synchronizing pulse whereby a synchronizing impulse is produced, a plurality of receiving channels, gating means to successively actuate said receiving channels, means to apply said synchronizing impulse to said gating means to control same, and means to apply said direct-current pulses to said receiving channels.

2. In a multiplex receiver for the reception of periodically transmitted trains of high-frequency pulses, each train being constituted by a synchronizing pulse of fixed duration and constant amplitude and a series of channel pulses of constant duration, the phase of each channel pulse being modulated in accordance with a distinct intelligence signal, the fixed duration of said synchronizing pulses exceeding the fixed duration of said channel pulses, the combination comprising a detector to demodulate the train of high-frequency pulses to produce a corresponding train of direct-current pulses, a limiter coupled to the output of said detector to limit the amplitude of said direct-current pulses to a predetermined value, a differentiating network coupled to the output of said limiter to derive impulses therefrom whose time position corresponds to the trailing edges of said direct current pulses, said differentiating network having a time constant which is smaller than the duration of said synchronizing pulse and larger than the duration of said channel pulses, a threshold device coupled to the output of said network, said device having a threshold level at which said device responds solely to the impulse corresponding to said synchronizing impulse to produce a synchronizing impulse, a plurality of receiving channels, gating means to actuate successively said channels, means to impose said synchronizing impulse on said gating means to control same, and means to apply said direct-current pulses from said detector to said receiving channels.

CORNELIS JOHANNES HENRICUS
ANTONIUS STAAL.

REFERENCES CITED

The following references are of record in the file of this patent:

UNITED STATES PATENTS

| Number | Name | Date |
|---|---|---|
| 2,218,067 | Faudell | Oct. 15, 1940 |
| 2,265,979 | Below | Dec. 16, 1941 |
| 2,292,148 | Moe | Aug. 4, 1942 |
| 2,416,330 | Labin | Feb. 25, 1947 |
| 2,418,127 | Labin | Apr. 1, 1947 |
| 2,425,491 | Schlesinger | Aug. 12, 1947 |
| 2,447,233 | Chatterjea et al. | Aug. 17, 1948 |

FOREIGN PATENTS

| Number | Country | Date |
|---|---|---|
| 108,926 | Australia | Nov. 9, 1939 |
| 365,519 | Italy | Dec. 6, 1938 |
| 845,380 | France | Aug. 21, 1939 |